United States Patent
Howard (10) Patent No.: US 9,357,375 B2
(45) Date of Patent: May 31, 2016

(54) TELECOMMUNICATIONS SYSTEMS AND METHODS AND SMART CARDS FOR USE THEREWITH

(75) Inventor: Peter Howard, Newbury (GB)

(73) Assignee: Vodafone Group PLC, Newbury (GB)

( * ) Notice: Subject to any disclaimer, the term of this patent is extended or adjusted under 35 U.S.C. 154(b) by 350 days.

(21) Appl. No.: 12/590,030

(22) Filed: Oct. 30, 2009

(65) Prior Publication Data

US 2010/0203864 A1    Aug. 12, 2010

(30) Foreign Application Priority Data

Oct. 30, 2008   (GB) ............................ 0819892.1
Oct. 29, 2009   (GB) ............................ 0918970.5

(51) Int. Cl.
    *H04B 1/38*      (2015.01)
    *H04W 8/18*      (2009.01)
    *H04W 12/04*     (2009.01)
    *H04W 8/04*      (2009.01)

(52) U.S. Cl.
    CPC ............. *H04W 8/18* (2013.01); *H04W 12/04* (2013.01); *H04W 8/04* (2013.01)

(58) Field of Classification Search
    CPC ....... H04W 88/06; H04W 48/18; H04W 4/24; H04W 8/06
    USPC ................. 455/411, 558, 435.1, 432.1, 432.3
    See application file for complete search history.

(56) References Cited

U.S. PATENT DOCUMENTS 7,281,263 B1 * 10/2007 LaMastres et al. .............. 726/2
2009/0191918 A1 * 7/2009 Mardiks ..................... 455/558
2009/0253409 A1 * 10/2009 Slavov et al. ................ 455/411

FOREIGN PATENT DOCUMENTS

| EP | 1 239 687 A1 | 9/2002 |
| WO | WO 03/013172 A1 | 2/2003 |
| WO | WO 03/013174 A1 | 2/2003 |
| WO | WO 2006/103383 A1 | 10/2006 |

* cited by examiner

*Primary Examiner* — Tu X Nguyen
(74) *Attorney, Agent, or Firm* — Knobbe Martens Olson & Bear, LLP (57) ABSTRACT

In a telecommunications system including a plurality of different networks, terminals and smart cards, each terminal is usable in a particular network in association with one of the smart cards when that smart card is registered with that network. Each smart card carries secret information specific to its registered home network and with which the network can authenticate the smart card and allow use of the terminal with which that smart card is associated. Each smart card may be registered with one of the networks as its home network, selectively de-registered from its home network, and re-registered with a different one of the networks as its home network by obtaining data including an International Mobile Subscriber Identifier for use with that network. The Identifier is transmitted to the smart card, and the secret information relating to a particular network activated when registering or re-registering the smart card with that network.

14 Claims, 4 Drawing Sheets

TELECOMMUNICATIONS SYSTEMS AND METHODS AND SMART CARDS FOR USE THEREWITH

TECHNICAL FIELD

This application relates to telecommunications systems and methods and smart cards for use therewith. This application has particular relevance to telemetric applications using smart cards such as SIM cards.

BACKGROUND

The telecommunications industry has developed on a country by country basis, with each country typically having multiple different network providers. Each network subscriber is registered with one of these providers, whose network then becomes their "home" network. Subscribers are allowed to travel to different countries and use the networks of other providers, but they remain registered with their home network operator.

For subscribers to securely communicate with their home network, this arrangement requires each subscriber to have a unique identity (e.g. their IMSI—International Mobile Subscriber Identifier), as well as unique authentication information. Typically the unique authentication information is a secret key shared with the network provider, and so the authentication information provided is for sole use with the network provider. Currently this information is issued to each subscriber via a SIM card when they register for service with a network provider. That is, the SIM card has an IMSI and a unique key stored thereon. In fact, it is a requirement of the telecommunications standards that each SIM card be specific to a particular network (the "home" network) and to have been issued under the control of the network operator.

In practice, SIM cards are supplied to the network operator in batches from a trusted SIM supplier. The SIM supplier will use information which it already holds to generate the SIM card bearing the necessary identification and authentication information and a particular IMSI. The SIM supplier will also advise the network operator of the data loaded onto the SIM card. This arrangement works adequately where the batch of SIMs is for use only by the particular network operator in their region.

This arrangement has worked adequately where the network provider has allocated the SIM cards with mobile terminals to individual users in their region. However, distribution chains are becoming less country specific. Therefore the problem has arisen, particularly for global companies like Vodafone, of terminals being allocated a SIM without the eventual country, and accordingly without the country-specific network provider, being known. In other words, this non-country specific distribution model conflicts with network requirements.

This issue is also a problem for telematic applications. Telemetry is the convergence between telecommunications and information processing so as to allow remote measurement and reporting. The applications of this technology are many and varied, including vehicle tracking, satellite navigation devices (e.g. Tom Tom™), the gathering of freight logistics data, vehicle fleet management (e.g. relating to the maintenance or breakdown of the vehicle), traffic camera management, measurement reporting for utility companies and equipment maintenance notifications/updates upon problems being detected. A key requirement of telemetry is the provision of a SIM with the equipment in order to allow information to be sent from, and/or received by, the equipment. Again, the eventual destination of a telematics terminal and its SIM may be unknown, which is problematic.

To illustrate a specific example of this problem, a telematics terminal with its SIM card may be incorporated into a vehicle (e.g. for providing telephone and data services for an occupant as well as transmitting/receiving other information relating to the operation of the vehicle). In such a case, the country to which the vehicle is exported may not be known at the time of manufacture. This would mean that a SIM appropriate for its destination country and applicable network provider cannot be installed during manufacturing of the vehicle and could only be installed when the destination country of the vehicle is known.

Similarly, if a user changes their country of residence, and wishes to register their mobile terminal in this new country, even if the umbrella network provider is the same (e.g. Vodafone), the operating conditions will be different due to the country-specific nature of the telecommunications industry, and so it may be necessary for the user to obtain a new SIM from the new local network provider (e.g. Vodafone Germany as opposed to the previous provider Vodafone UK).

A related problem is where an individual subscriber wishes to changes providers within their particular country (e.g. from Orange UK to Vodafone UK). As the information on the SIM includes information only usable by the subscriber's initial network provider, it may be necessary for the subscriber to obtain a new SIM with new unique authentication information from the new provider.

This allocation and swapping over to a new SIM card when transferring to a new provider is usually acceptable to individuals, as it generally does not happen on a regular basis. However, for telematic applications, the issue is more complex.

In these circumstances, each entity managing a telematics application requiring the use of SIMs will have an arrangement with a particular network provider in order to be able to send and receive information from and/or to the SIMs. This arrangement will be satisfactory as long as the managing company is happy to stay with their particular network provider. However, even with ever-present competition from rival network providers, the changing over of each and every applicable SIM would be a labour intensive and costly requirement, and therefore a disincentive to take up a more competitive rate/tariff for communicating with their assemblage of SIMs.

This problem is actually one likely to be exacerbated in the near future, as the sheer volume of telematic terminals in use is forecast to increase considerably.

There is therefore a need to overcome or at least ameliorate at least one of the problems of the prior art.

SUMMARY OF THE INVENTION

Embodiments of the system described herein, to be described in more detail below by way of example only, include mobile telecommunications systems which use smart cards in the form of subscriber identity modules (SIMs) carrying identification and authenticating information for identifying a telecommunications terminal within the system and authorising it to function in the system. For example, a SIM may be personal to a particular individual, by means of which that individual can activate a telecommunications terminal (e.g. a telephone handset) and use it for telecommunications purposes within the system. In another example, however, a SIM may be used in a telematics application to identify a particular article or equipment for use in the system.

According to a first aspect, the system described herein provides, in a telecommunications network including a plurality of network providers, a method of using a telecommunications terminal or a telematic terminal to reconfigure a smart card from being registered with a first network provider to being registered with a second network provider, the method including: receiving a reconfiguration request, the request including an identifier relating to the second network provider; selecting a set of authentication information from a store of one or more pre-stored authentication information sets, wherein each set of authentication information in the store is usable by any network provider; retrieving an identifier associated with the selected set of authentication information; sending the authentication information identifier for provision to the second network provider, such that the authentication information identifier is usable by the second network provider to access authentication information corresponding to the selected set of authentication information on the SIM; and associating the selected authentication information set with the second network provider identifier.

This aspect of the system described herein advantageously enables the SIM to be associated with any network in the future. Previous solutions have required the list of networks to which the SIM can be associated to be defined when data is initially loaded onto the SIM. This arrangement is adequate for large network providers who use a global HLR, but does not provide for users changing network providers whose details are not pre-defined (and pre-defining all possible network providers is not a viable option).

However, in the system described herein, by pre-storing generic authentication data usable by any network, this constraint is avoided. That is, this aspect of the system described herein enables authentication information to be pre-stored on the smart card, without the need to preconfigure users for each authentication information set. This aspect of the system described herein is therefore a practical solution for enabling the SIMs to be associated with any network during their lifetime.

This aspect of the system described herein is particularly advantageous in machine to machine application where it is difficult to physically change the SIM card, when required.

In a more specific aspect, the system described herein provides a mobile telecommunications system, comprising a plurality of different predetermined networks, with a plurality of terminals for use in the system; each terminal being usable in a particular one of the networks in association with a given smart card when that smart card is registered with that network; and a registration device that registers each smart card with a particular one of the networks as its home network, each smart card carrying secret information specific to the home network with which the smart card is registered and by means of which that network can authenticate the smart card and allow use of the terminal with which that smart card is associated in that network; and wherein the registration device is operable to de-register each smart card from the network with which it is registered as its home network and to re-register each smart card with a different one of the networks as its home network by the registration device obtaining from said one of the networks data including an International Mobile Subscriber Identifier—IMSI—particular to and for use with that network, transmitting said IMSI to the smart card, and activating the secret information relating to a particular one of the networks when registering or re-registering the smart card with that network.

According to a further more specific aspect of the system described herein, there is also provided a mobile telecommunications method for use with a plurality of different predetermined networks, a plurality of terminals and a plurality of smart cards, each terminal being usable in a particular one of the networks in association with one of the smart cards when that smart card is registered with that network, and each smart card carrying secret information specific to the home network with which the smart card is registered and by means of which that network can authenticate the smart card and allow use of the terminal with which that smart card is associated in that network; the method including registering each smart card with a particular one of the networks as its home network, selectively de-registering each smart card from the network with which it is registered as its home network and re-registering each smart card with a different one of the networks as its home network by obtaining from said one of the networks data including an International Mobile Subscriber Identifier—IMSI—particular to and for use with that network, transmitting said IMSI to the smart card, and activating the secret information relating to a particular one of the networks when registering or re-registering the smart card with that network.

According to a still further more specific aspect of the system described herein, there is further provided a smart card for use in a mobile telecommunications system comprising a plurality of different predetermined networks and for association with a terminal to enable that terminal to be usable in a particular one of the networks when that smart card is registered with that network as its home network, each smart card carrying secret information specific to the home network with which the smart card is registered and by means of which that network can authenticate the smart card and allow use of terminal with which that smart card is associated in that network; and wherein the smart card is selectively de-registerable from the network with which it is registered as its home network and re-registerable with a different one of the networks as its home network by obtaining from said one of the networks data including an International Mobile Subscriber Identifier—IMSI—particular to and for use with that network, and activating the secret information relating to a particular one of the networks when registering or re-registering the smart card with that network.

In an additional aspect, the system described herein provides, in a telecommunications network including a plurality of network providers, a network entity for transferring the registration of a smart card from a first network provider to a second network provider, the smart card having a plurality of pre-stored sets of authentication information, with each set usable by any one of the plurality of network providers, the network entity including: a transmitter configured to transmit a reconfiguration request to a telecommunications or telematics terminal associated with the smart card, in order to reconfigure the smart card for use with the second network provider, the request including an identifier relating to the second network provider; a receiver configured to receive a response from the terminal, the response including a unique identifier associated with a selected set of authentication information stored on the smart card; and the transmitter further configured to transmit the unique identifier to the second network provider so that the second network provider may have access to authentication information corresponding to the selected set of authentication information on the SIM.

The identifier relating to the second network included in the reconfiguration request may be a new IMSI (International Mobile Subscriber Identity) for use by the second network provider.

BRIEF DESCRIPTION OF THE DRAWINGS

Telecommunications systems and methods embodying the system described herein, and SIM cards embodying the system described herein for use in such systems and methods, will now be described, by way of example only, with reference to the accompanying diagrammatic drawings, in which.

DETAILED DESCRIPTION OF VARIOUS EMBODIMENTS

In mobile telecommunications systems such as that of the GSM or UMTS (third generation or 3G type), transmitting and receiving terminals (telephone handsets, for example) are provided with individual smart cards or SIM cards which are used to activate the terminals. The SIM cards are specific to the customers and will carry information particular to each customer such as the customer's IMSI (International Mobile Subscriber Identifier) together with authentication information.

In telematic applications, SIM cards are used for analogous purposes—providing the relevant identification (e.g. IMSI) and authentication information for each telematics terminal.

In each case, each SIM card will be specific to a particular network (the "home" network)—that is, it will have been issued under the control of the operator of that network and will be for use within that network.

The usual way for a network operator to order a SIM card (or, of course, a batch of such cards in practice), involves the network operator requesting the cards from a SIM supplier, who will be in the position of a trusted supplier to the network operator. The SIM supplier will use information which it already holds to generate the SIM card bearing the necessary identification and authentication information and a particular IMSI. The SIM manufacturer will then supply the SIM card to a network operator or to a terminal manufacturer such as a manufacturer of a telephone handset, a telematics terminal or some other terminal for use in the network. The SIM supplier will also advise the network operator of the data loaded onto the SIM card. In due course, the SIM card and terminal will be supplied to a customer. At that stage, the network operator will activate the SIM card, making use of the information concerning the SIM cards already supplied to it by the SIM supplier. The SIM card, and thus the terminal associated with it, are now active and can be used in the network.

However, in view of developments in mobile telecommunications systems and particularly (though not only) in telematics applications, such a known arrangement is not completely satisfactory, particularly for telematics terminal where the SIM card is incorporated into a product when located in one country (for example, during manufacture of the product) but the product is for export for use in another country. The eventual destination of the product may be unknown at the time when the terminal and its SIM card are incorporated into the product.

Figure 1:
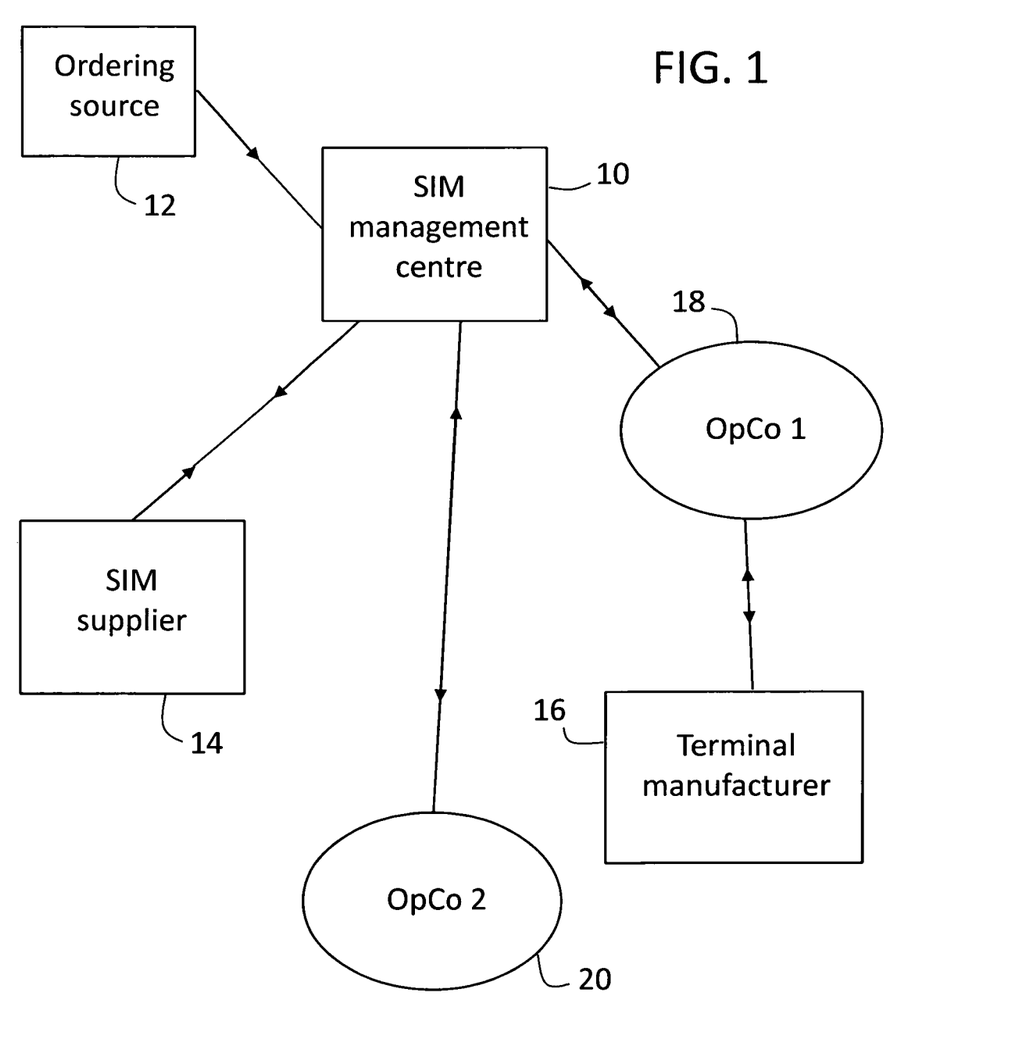
FIG. 1 illustrates an example schematic diagram of the network elements involved in distributing new SIMs, the diagram useful in illustrating an embodiment of the system described herein.
Figure 2:
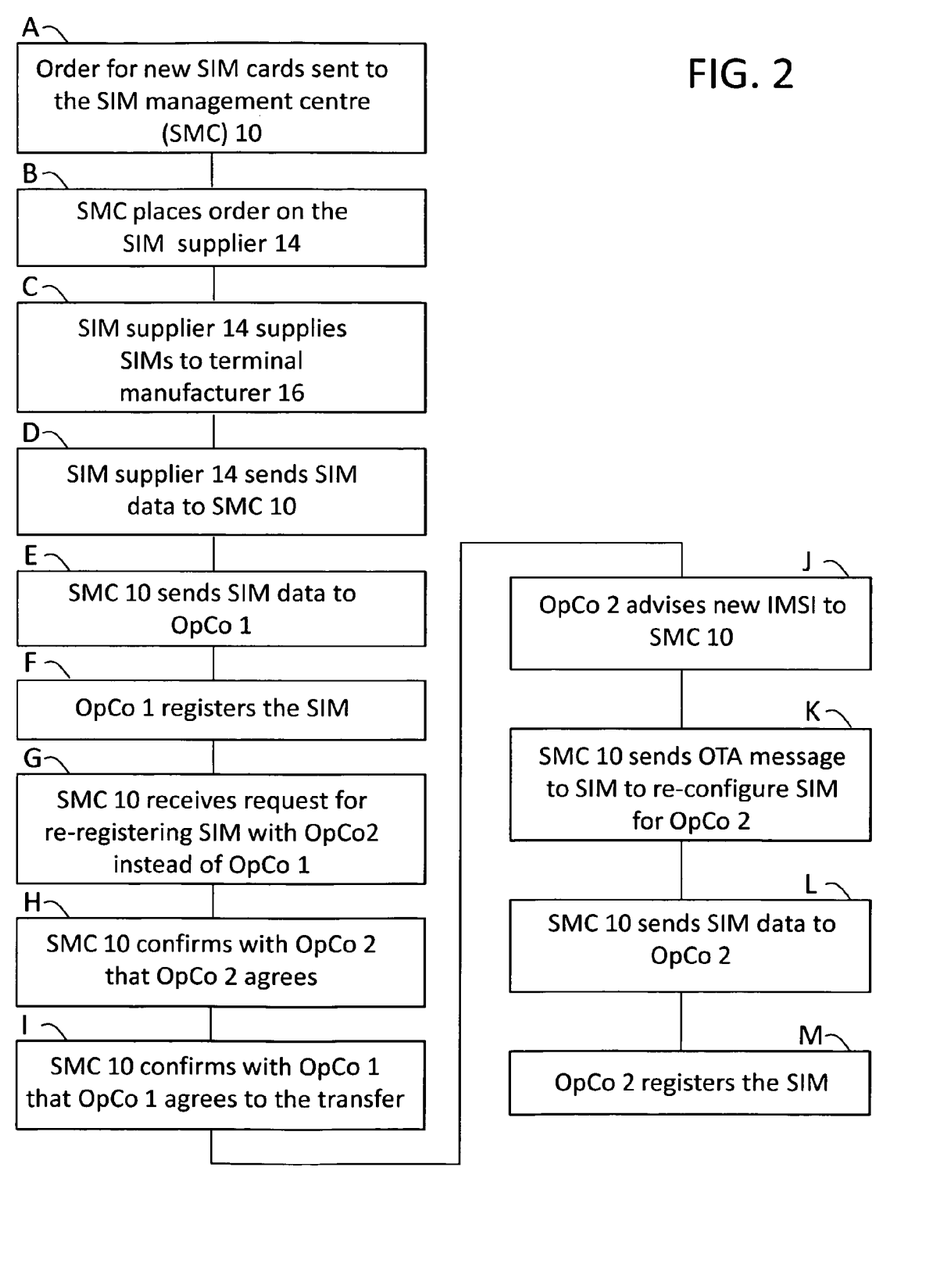
FIG. 2 is a corresponding flow chart showing the order of communications and steps for the embodiment described in relation to FIG. 1.

One way in which greater flexibility can be achieved, with the eventual destination of the product being irrelevant, is described in relation to FIGS. 1 and 2.

The schematic network arrangement of FIG. 1 shows the different relationships between the relevant network entities in the creation and provision of SIM cards according to a first embodiment of the system described herein. As shown in FIG. 1, a SIM management centre 10 is provided. This can be located anywhere. For example, where a group of networks are all owned or controlled in common, the SIM management centre 10 can be located at the controlling entity. Orders for the supply of a new batch of SIM cards are received by the SIM management centre 10 from an ordering source 12 (Step A, FIG. 2). Such a source might, for example, be any one of the group of networks. In response to such an order, the SIM management centre 10 places the order with a SIM supplier 14 (Step B, FIG. 2)). The order will identify the particular network in which the SIM card is to be used initially (that is, the first home network).

The SIM card supplier 14 now manufactures the SIM cards, placing all the necessary information on them. This information may include an IMSI, where an intended home network is known, and also a record providing all the secret information specific to the operator of that particular network (secret keys, OTA transport key, parameters for the particular operator's algorithm and others) which is required for authenticating the SIM card in use; the SIM supplier will obtain this secret information from information which it already has and which, of course, it maintains in a secure fashion. In addition, a common SIM mask may be stored on the SIM card, for example, a mask particular to the entity owning or controlling the networks.

In accordance with a particular feature of the system described herein, and for a purpose to be explained, the SIM supplier also includes on the SIM card similar records of security secret information that may be used by any other networks in the group. In other words, the SIM card includes a storage space containing multiple records of generic secret information that is usable by each of the networks in the group. Each of these records is in principle separately activatable. Initially, however, only the record applicable to the intended operator of the network in which the SIM card is to be initially registered is activated.

The SIM card is now sent by the SIM supplier 14 to a terminal manufacturer 16 such as a manufacturer of telematics terminals (Step C). Details of the information which the SIM manufacturer has placed on the SIM card are sent back to the SIM management centre (SMC)) 10 (Step D). At this stage, the SIM card is not yet activated.

The SIM management centre 10 now passes the details of the particular SIM card to the operating company OpCo 1 (18) of the network in which the SIM card is to be initially used (Step E). Thus, OpCo 1 receives the IMSI for the SIM card, and details of the relevant secret information. Preferably, the SIM management centre 10 supplies all this information to OpCo 1 (18), in the same format as normally provided by the SIM manufacturer in the standard SIM activation process.

When the terminal manufacturer has associated the SIM card with the telematics terminal, and the terminal is ready for use (for example, it has been incorporated into a particular product such as a vehicle as described above), the SIM card is now ready for activation. Once activated, the SIM card, and thus the associated terminal, are now "live" in the network of OpCo 1 which is thus the home network for that SIM card.

It will now be assumed that it is necessary for the SIM card to be registered with a different network to that of its home network. Thus, such a re-registering request may be generated by an operating company 20 ("OpCo 2"), being the operator of another one of the networks in the group of networks and in which the telematics terminal with which the particular SIM card is associated is now primarily located. This re-registering request may be generated in various different ways. For example, it may be generated by a specific request made by the person in charge of the product containing the telematics terminal. However the request originates, it is passed to the ordering source 12 and then sent to the SIM management centre 10 (Step G).

The SIM management centre 10 now confirms with OpCo 2 that OpCo 2 is prepared to become the home network of the SIM card (Step H). If this confirmation is received, the SIM management centre 10 then confirms that OpCo 1 is prepared to release the SIM card (Step I). This process may involve requesting confirmation from the particular user that such release and transfer to OpCo 2 is agreed. Assuming that OpCo 1 confirms release, OpCo 2 informs the SIM management centre 10 of the new IMSI which the SIM card will now need (Step J).

The SIM management centre 10 now sends an OTA message to the SIM card, to enable it to be registered with OpCo 2 instead of OpCo 1 (Step K). This message would include the new IMSI for the SIM card which will have been obtained from OpCo 2 (at Step J). In addition, the OTA message will access the part of the SIM card storing the records mentioned above relating to the generic secret information, and will activate one of the records for OpCo 2 and de-activate the record specific to OpCo 1.

The SIM management centre 10 will at this time hold all the necessary information relating to the SIM card—in the same way as it did initially when the card was manufactured by the SIM supplier 14 which supplied this information to the SIM management centre 10 (see Step D). Thus, the SIM management centre 10 will hold the original information received from the SIM supplier concerning the SIM card and will now hold the new IMSI (obtained from OpCo 2) (see Step J) and will also know the secret information corresponding to that originally stored on the SIM. In this embodiment, the secret information on the SIM is stored in a list and allocated sequentially or according to some other predetermined pattern.

Therefore, the SIM management centre 10 can now supply all this information to OpCo 2 (Step L), including the corresponding secret authentication information by virtue of knowing the SIM's order of allocation and history of allocation. Just as when this information was originally sent to OpCo 1 (Step E), the information sent to OpCo 2 will be in the same general format as normally provided by the SIM supplier in the usual SIM activation process.

When OpCo 2 now receives a request to activate the SIM card within the network of OpCo 2, it has all the necessary information with which to activate the SIM within that network, as its new home network.

In an exactly similar fashion, the SIM card can, if desired, be re-registered into a third network in the group of networks.

Because one or more generic sets of secret authentication information is already stored on the SIM card, which can be used by any network to activate the SIM card, there is optimum maintenance of security—because none of the secret information has to be transmitted to the SIM card and re-written on the SIM card.

Although it is advantageous to use a central SIM management centre 10 for managing the transfer of the SIM card between networks, this is not essential. Instead, the necessary functions could be carried out by the operating companies of the networks.

The secret information provided on the SIM can include secret keys, OTA transport key and other applicable parameters required for authenticating the SIM in use. All this secret information is stored on the SIM in a secure manner but, initially, in this embodiment of the system described herein, only the record which is applicable to the operator to which the SIM card is initially registered is activated. At a later time, if the SIM is to be registered to another network, a new secret/authentication information record that is pre-stored is activated.

Figure 3:
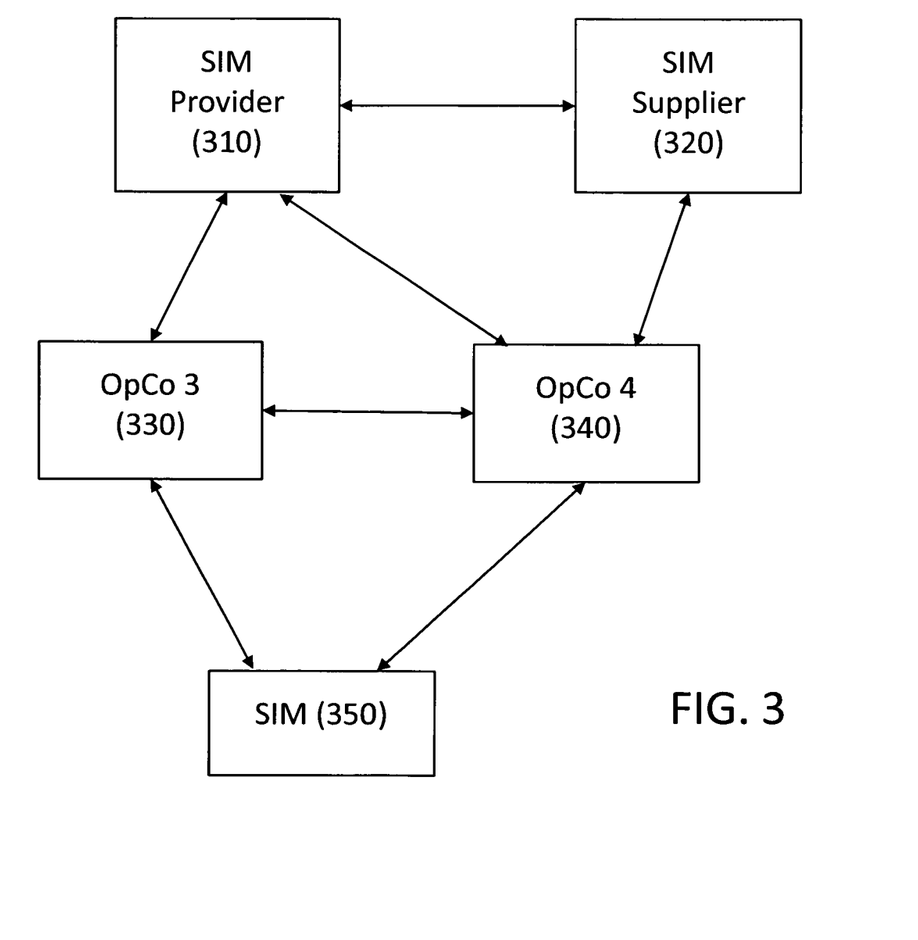
FIG. 3 illustrates an alternative example schematic configuration of the network elements involved in distributing new SIMs, the diagram useful in illustrating a further embodiment of the system described herein.
Figure 4:
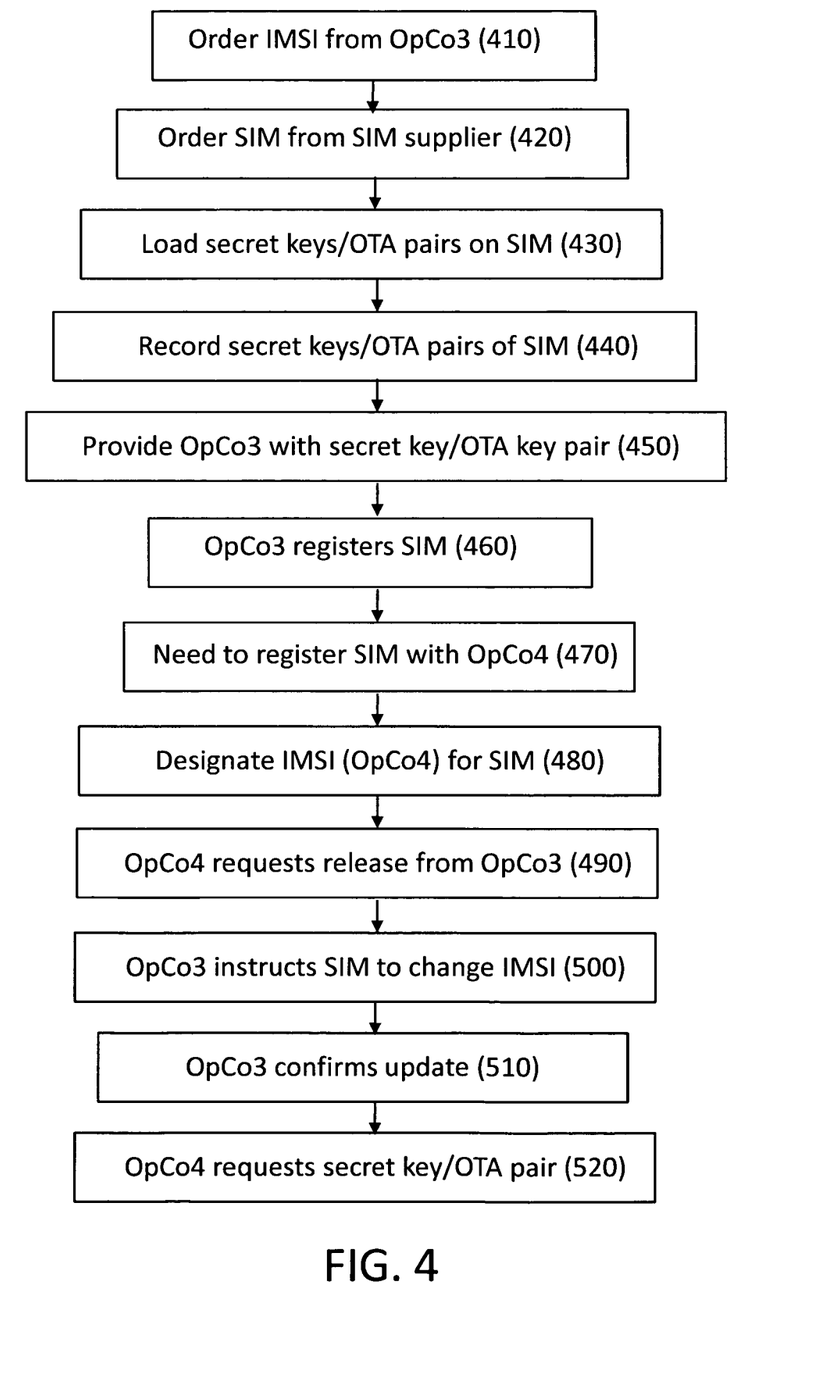
FIG. 4 illustrates a corresponding flow diagram showing the order of communications and steps for the embodiment described in relation to FIG. 3.

FIG. 3 shows the engagement between entities in an alternative embodiment of the system described herein in which a SIM provider 310 wishes to distribute SIMs to its customers. FIG. 4 is a corresponding flow diagram showing the order of communications and steps.

An example of a SIM provider 310 may be a car manufacturer which wishes to provide SIMs in each of its vehicles or an energy company which wishes to install SIMs in each of its meters in order to receive over the air updates of the energy used by its customers. Typically, the SIM provider will be associated with a particular network operator (OpCo3) with which it will contract its over the air communications. That network will be the initial network with which the SIM will be associated and the network will provide the SIM provider with IMSIs to be allocated to SIMs.

At 410 the SIM provider 310 orders a number of IMSIs from the network which it wishes to handle its communications (OpCo3 330). Each IMSI is to be associated with a particular SIM 350 and at 420 the SIM provider 310 orders the SIM from a SIM supplier 320 and provides the SIM supplier 320 with the IMSI to be associated with that SIM 350. At 430 the SIM supplier 320 loads the SIM with a predefined number of secret subscriber authentication keys (Kis) and an associated OTA secret key, these are referred to as secret key/OTA key pairs in the remainder of the document. If there are x number of secret key/OTA key pairs, the key pairs are indexed from 1 to x. The IMSI of OpCo3 is assigned to the first indexed secret key/OTA key pair. The indexed secret key/OTA key pairs are stored on the SIM 350 and are also recorded by a trusted party along with the SIM ID at 440. The trusted party may be the SIM supplier 320 or may be a trusted third party. The SIM 350 is then provided to the SIM provider 310 for distribution.

The secret key/OTA key pairs and SIM ID of SIM 350 are provided to OpCo3 along with the corresponding IMSI at 450. OpCo3 may be provided with this information from the SIM provider 310 or receive this directly by the SIM manufacturer 320 or trusted third party. Once the SIM 350 is allocated to a customer and OpCo3 has the secret key/OTA key pair and data for each SIM it is able to activate and register the SIM at 460 using OTA transmissions in the usual way, as discussed above. The SIM card is now live in the network of OpCo3 which is the home network for that SIM card.

At a later time, it may be necessary for the SIM to register with a different network. For example, in the case where the SIM is located in an energy meter, the customer may change energy supplier to a supplier which uses a different network, for example OpCo4 340, for its over the air communications. Alternatively, the existing energy supplier may switch its contract to OpCo4 and so needs to re-register all its SIMs with OpCo4. In these examples, the SIM will need to be de-registered with OpCo3 and registered with OpCo4.

At 470, there is a need to reregister the SIM with OpCo4 and OpCo4 will designate an IMSI to the customer at 480. At 490 OpCo4 contacts OpCo3 and in a request message requests that OpCo3 releases SIM 350. The request message to OpCo3 will include a new IMSI (IMSI(OpCo4)) for SIM 350 which OpCo4 has allocated to the SIM.

At 500 OpCo3 instructs SIM 350 to change its IMSI to IMSI(OpCo4). This is performed using known Over The Air (OTA) procedures. Additionally, OpCo3 will instruct the SIM to associate IMSI(OpCo4) with a new index value for secret key/OTA key pair. Typically, this could be the next secret key/OTA key pair stored in its list of secret keys/OTA key pairs. In the final stage of the OTA procedure, OpCo3 instructs SIM 350 to reset and to present IMSI(OpCo4) the next time it is activated. A network can now only communicate with SIM 350 using IMSI (OpCo4) and the new secret key/OTA key pair. It is to be appreciated that it is not essential to the system described herein that the reconfiguration instruction to change the IMSI is received directly from OpCo3. Instead, the reconfiguration instruction may originate from another network element, such as one controlled by OpCo4, but with additional information confirming OpCo3's consent to the change.

At 510 OpCo3 confirms to OpCo4 that SIM has been updated and provides OpCo4 with the SIM ID along with the IMSI associated with that SIM ID and the index number for the secret key/OTA key pair to be used in communications with SIM 350. In order to be able to communicate with the SIM, OpCo4 must obtain the secret key/OTA key pair associated with the index value. In order to obtain this information, OpCo4 contacts the SIM Supplier 320 or the trusted party at 520 and requests the secret key/OTA key pair associated with the SIM ID for the index value. At this stage, OpCo4 may be required to authenticate itself in order to be provided with this information. Once OpCo4 has been authenticated, the secret key/OTA key pair for that index of the specific SIM is provided at 530.

When OpCo4 has received the secret key/OTA key pair, it has the IMSI, secret key, OTA key and SIM ID for SIM 350. It is able to register the SIM at 530 and commence communications with the SIM.

In the future, if SIM 350 is required to be ported to a different network, steps 470 to 530 will be performed again.

Embodiments of the system described herein provide the advantage that a SIM can be ported to any network after manufacture. The only potential limitation on the number of times that a SIM can be ported using the above embodiment is the number of secret key/OTA key pairs which are pre-loaded on the SIM at manufacture.

In various embodiments of the system described herein, all involved networks may support a common AKA algorithm (and common sequence number management scheme for USIMs/ISIMs) in their HLR/AuC (Authentication Centre). It is proposed that a G-Milenage (Milenage for USIMs/ISIMs) profile (e.g. G-Milenage with OP set to 128 zeroes etc) is prescribed for this. The scheme may be extended to allow a different set of randomly generated OP parameter values to be associated with each secret key/OTA key pair in the list stored on the SIM. The new operator would then obtain the new OP parameter values from the SIM manufacturer based on SIM ID and index value presented. The scheme may also be extended to support SIMs which support multiple AKA algorithms or sequence number management schemes, such that the correct AKA algorithm and sequence number management scheme can be selected using the OTA procedures.

Additionally, in other embodiments, all involved operators may use 3GPP (now partly ETSI SCP) specified OTA procedures (an M2M profile of OTA may be needed).

The embodiments described are to be considered as illustrative of the system described herein and not limiting, as changes and additions are possible. For instance, the above embodiments are described in relation to a SIM. Of course, the system described herein may also be implemented using USIMs or ISIMs.

Further, the embodiments described above have assumed that the authentication algorithm used by all network providers is the same (i.e. so the same type of keys can be used). In practice, this covers the majority of situations, however, it is also within the scope of the system described herein for a number of different groups of authentication information sets to be defined in order to cater for the usage of different authentication algorithms. For this to be effected, the terminal associated with the SIM will need to be notified of the type of authentication algorithm being used by the network operator to whom the SIM is to be assigned, so that authentication information fitting the algorithm being used can be selected.

Additionally, the embodiments described have assumed that the SIM will only have one network provider at any one time. However, it is also within the scope of the system described herein for multiple subscriptions to be in operation on the SIM at any one time. The system described herein can be used for such a SIM to update the network provider for any one or all of the subscriptions on the SIM.

Various of the embodiments discussed herein may be combined with each other in appropriate combinations in connection with the system described herein. Further, the system described herein may be implemented using software, hardware, and/or a combination of software and hardware. Software implementations of the system described herein may include executable code that is stored in a computer-readable storage medium and executed by one or more processors. The computer-readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. In a telecommunications network including a plurality of network providers, a method of using a terminal to reconfigure a smart card from being registered with a first network provider to being registered with a second network provider, the method comprising:

receiving, at the smart card, a reconfiguration request from the second network provider, the request including an identifier for the smart card, the identifier provided by the second network provider;

selecting, in response to receiving the reconfiguration request, a set of authentication information from a store of authentication information sets, wherein the authentication information sets are pre-stored in the store prior to the smart card being registered with any network provider and without the smart card receiving the authentication information sets from any network provider, each authentication information set including information for use by network providers to activate the smart card, wherein the store is on the smart card, wherein each set of the pre-stored authentication information sets in the store is associated with a unique identifier, and wherein any of the pre-stored authentication sets is usable by any of the plurality of network providers to enable registration of the smart card therewith, each of the pre-stored authentication information sets being associated with secret information that is generic to all of the pre-stored authentication information sets; and associating the selected authentication information set with corresponding authentication information at the second network provider identifier in order to enable the registration of the smart card with the second network provider.

2. The method of claim 1, further comprising:

replacing an existing first network provider identifier and authentication information relating to the first network provider with the respective identifier and authentication information of the second network provider so that the smart card is deregistered from the first network provider and registered with the second network provider.

3. The method of claim 1, wherein the pre-stored authentication information sets are stored in a list and a set for the second network provider is selected by choosing the next set in the list.

4. In a telecommunications network including a plurality of network providers, a method of transferring the registration of a smart card from a first network provider to a second network provider, the smart card having a plurality of pre-stored sets of authentication information, with each set usable by anyone of the plurality of network providers, the method comprising:

transmitting a request from the second network provider to the smart card to reconfigure for use with the second network provider, the request including an identifier provided by the second network provider, wherein each set of the pre-stored authentication information sets in the store is associated with a unique identifier;

obtaining, in response to transmitting the request to reconfigure, a selected unique identifier associated with a selected set of authentication information selected by the smart card from the pre-stored sets of authentication information on the smart card for use by the second network provider, wherein the pre-stored authentication information sets are pre-stored in a store of the smart card prior to the smart card being registered with any network provider and without the smart card receiving the authentication information sets from any network provider, each authentication information set including information for use by network providers to activate the smart card, and wherein any of the pre-stored authentication sets is usable by any of the plurality of network providers to enable registration of the smart card therewith, each of the pre-stored authentication information sets being associated with secret information that is generic to all of the pre-stored authentication information sets; and transmitting the selected unique identifier to the second network provider so that the second network provider may have access to authentication information corresponding to the selected set of authentication information on the smart card.

5. The method of claim 4, wherein the identifier relating to the second network included in the reconfiguration request is a new IMSI (International Mobile Subscriber Identity) for use by the second network provider.

6. The method of claim 4, wherein the selected unique identifier associated with the selected set of authentication information is an index number, and wherein the method further comprises:

transmitting the index number to the smart card in order to indicate the set of pre-stored authentication information to be used by the second network provider.

7. The method of claim 4, wherein the reconfiguration request is transmitted by the first network provider using an over the air (OTA) protocol.

8. A non-transitory computer readable medium storing software for, in a telecommunications network including a plurality of network providers, using a telecommunications terminal or a telematic terminal to reconfigure a smart card from being registered with a first network provider to being registered with a second network provider, the software comprising:

executable code that receives, at the smart card, a reconfiguration request from the second network provider, the request including an identifier for the smart card, the identifier provided by the second network provider;

executable code that selects, in response to receiving the reconfiguration request, a set of authentication information from a store of authentication information sets, wherein the authentication information sets are pre-stored in the store prior to the smart card being registered with any network provider and without the smart card receiving the authentication information sets from any network provider, each authentication information set including information for use by network providers to activate the smart card, wherein the store is on the smart card, wherein each set of the pre-stored authentication information sets in the store is associated with a unique identifier, and wherein any of the pre-stored authentication sets is usable by any of the plurality of network providers to enable registration of the smart card therewith, each of the pre-stored authentication information sets being associated with secret information that is generic to all of the pre-stored authentication information sets; and executable code that associates the selected authentication information set with corresponding authentication information at the second network provider identifier in order to enable the registration of the smart card with the second network provider.

9. The non-transitory computer readable medium of claim 8, wherein the software further comprises:

executable code that replaces an existing first network provider identifier and authentication information relating to the first network provider with the respective identifier and authentication information of the second network provider so that the smart card is deregistered from the first network provider and registered with the second network provider.

10. The non-transitory computer readable medium of claim 8, wherein the pre-stored authentication information sets are stored in a list and a set for the second network provider is selected by choosing the next set in the list.

11. A non-transitory computer readable medium storing software for, in a telecommunications network including a plurality of network providers, transferring the registration of a smart card from a first network provider to a second network provider, the smart card having a plurality of pre-stored sets of authentication information, with each set usable by anyone of the plurality of network providers, the software comprising:

executable code that transmits a request from the second network provider to the smart card to reconfigure for use with the second network provider, the request including an identifier provided by the second network provider, wherein each set of the pre-stored authentication information sets in the store is associated with a unique identifier;

executable code that obtains, in response to transmitting the request to reconfigure, a selected unique identifier associated with a selected set of authentication information selected by the smart card from the pre-stored sets of authentication information on the smart card for use by the second network provider, wherein the pre-stored authentication information sets are pre-stored in a store of the smart card prior to the smart card being registered with any network provider and without the smart card receiving the authentication information sets from any network provider, each authentication information set including information for use by network providers to activate the smart card, and wherein any of the pre-stored authentication sets is usable by any of the plurality of network providers to enable registration of the smart card therewith, each of the pre-stored authentication information sets being associated with secret information that is generic to all of the pre-stored authentication information sets; and; and executable code that transmits the selected unique identifier to the second network provider so that the second network provider may have access to authentication information corresponding to the selected set of authentication information on the smart card.

12. The non-transitory computer readable medium of claim 11, wherein the identifier relating to the second network included in the reconfiguration request is a new IMSI (International Mobile Subscriber Identity) for use by the second network provider.

13. The non-transitory computer readable medium of claim 11, wherein the selected unique identifier associated with the selected set of authentication information is an index number, and wherein the software further comprises:

executable code that transmits the index number to the smart card in order to indicate the set of pre-stored authentication information to be used by the second network provider.

14. The non-transitory computer readable medium of claim 11, wherein the reconfiguration request is transmitted by the first network provider using an over the air (OTA) protocol.

* * * * *